US009380462B1

(12) United States Patent
Vivanco

(10) Patent No.: US 9,380,462 B1
(45) Date of Patent: Jun. 28, 2016

(54) DETECTING UNAUTHORIZED TETHERING

(71) Applicant: Sprint Spectrum LP, Overland Park, KS (US)

(72) Inventor: Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 179 days.

(21) Appl. No.: 13/833,948

(22) Filed: Mar. 15, 2013

(51) Int. Cl.
*H04M 1/66* (2006.01)
*H04W 12/08* (2009.01)
*H04W 88/04* (2009.01)
*H04W 80/04* (2009.01)
*H04W 12/12* (2009.01)

(52) U.S. Cl.
CPC .............. *H04W 12/08* (2013.01); *H04W 88/04* (2013.01); *H04W 12/12* (2013.01); *H04W 80/04* (2013.01)

(58) Field of Classification Search
CPC ..... H04W 12/12; H04W 48/00; H04W 88/04; H04W 12/08; H04W 80/04; H04M 15/47; H04M 2215/0148
USPC .............................. 455/410–411; 379/114.14
See application file for complete search history.

(56) References Cited

U.S. PATENT DOCUMENTS

| 2005/0202800 | A1* | 9/2005 | Wang ........................ 455/404.1 |
| 2010/0267368 | A1 | 10/2010 | Masputra |
| 2012/0106346 | A1* | 5/2012 | Aguirre et al. ................ 370/237 |
| 2013/0091268 | A1* | 4/2013 | Bopardikar et al. .......... 709/224 |
| 2013/0159503 | A1* | 6/2013 | Erman et al. .................. 709/224 |
| 2013/0171964 | A1* | 7/2013 | Bhatia et al. .................. 455/411 |

OTHER PUBLICATIONS http://forum.xda-deyelopers.com/showthread.php?t=999313, Tethering and hiding, Posted Mar. 19, 2011.*

* cited by examiner

*Primary Examiner* — Thai Vu

(57) ABSTRACT

In systems and methods of detecting a wireless device utilizing unauthorized tethering, it is determined that a number of wireless devices in active communication with the access node meets a connections criteria, and that an access node loading meets a loading criteria. Packets received at the access node from the wireless devices are inspected to identify at least one short-lived data flow and a source wireless device of the at least one short-lived data flow. It is determined for the source wireless device a number of short-lived data flows during an observation time period, and the source wireless device is identified as performing unauthorized tethering when the number of short-lived data flows during the first time period meets a data flow threshold.

20 Claims, 6 Drawing Sheets

DETECTING UNAUTHORIZED TETHERING

Wireless devices can provide access to wireless communication networks and to a wide range of services available through such communication networks. Wireless devices can also share their capability to access wireless networks with other devices, sometimes referred to as tethering. The use of wireless devices for unauthorized tethering is a major concern for network operators. While typical network resource consumption by a wireless device by itself is relatively small, unauthorized tethering can cause an increase in the usage of network resources, and can also contribute to network congestion having a negative impact to other network subscribers. Furthermore, unauthorized tethering creates unfairness among subscribers, since network operators typically allocate resources to subscribers who are authorized to perform tethering, but plan no such allocation for subscribers who are not authorized. Where, for example, communication bandwidth is allocated proportionally to the amount of data transferred, those wireless devices which are performing unauthorized tethering transmit and receive more data because they are supporting multiple devices, and unauthorized devices tend to demand greater services than those devices not performing tethering.

OVERVIEW

In operation, it is determined that a number of wireless devices in active communication with the access node meets a connections criteria, and that an access node loading meets a loading criteria. Packets received at the access node from the wireless devices are inspected to identify at least one short-lived data flow and a source wireless device of the at least one short-lived data flow. It is determined for the source wireless device a number of short-lived data flows during an observation time period. The source wireless device is identified as performing unauthorized tethering when the number of short-lived data flows during the first time period meets a data flow threshold.

DETAILED DESCRIPTION

Figure 1:
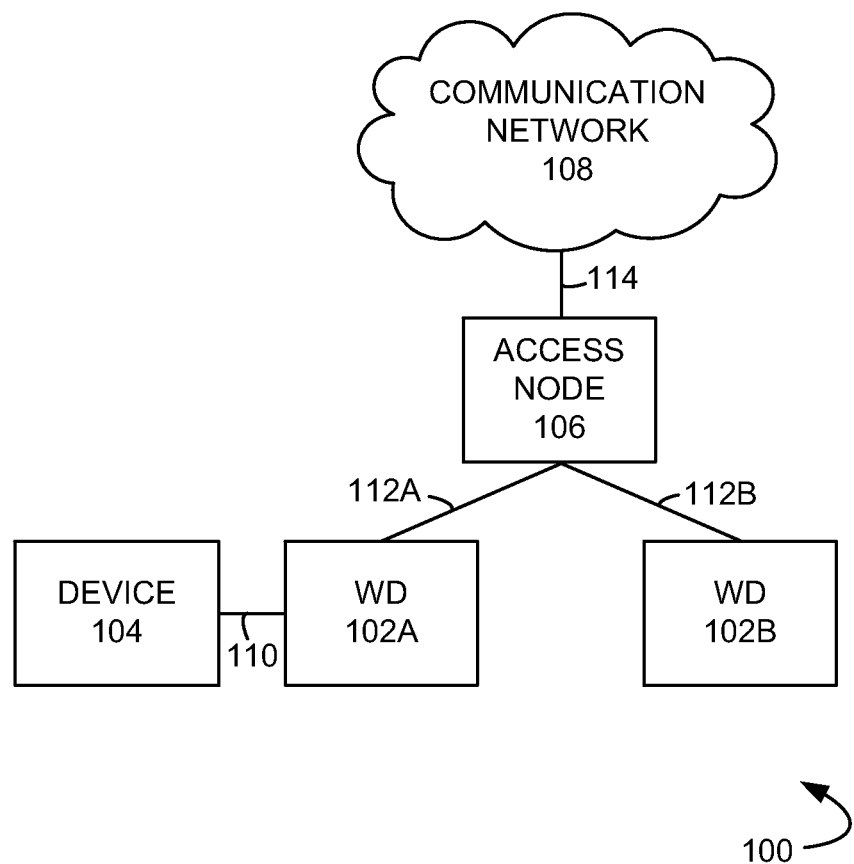
FIG. 1 illustrates an exemplary communication system to detect unauthorized tethering by a wireless device.

FIG. 1 illustrates an exemplary communication system 100 for detecting unauthorized tethering comprising wireless devices 102A and 102B, additional device 104, access node 106, and communication network 108. Examples of wireless devices 102A and 102B, and additional device 104, can include a cell phone, a smart phone, a computing platform such as a laptop, palmtop, or tablet, a personal digital assistant, an internet access device, or other device capable of wireless communication, including combinations thereof. Additional device 104 can communicate with wireless device 102A over communication link 110.

Access node 106 is in communication with wireless device 102A over communication link 112A and with wireless device 102B over communication link 112B. Access node 106 is a network node capable of providing wireless communications to wireless devices 102A and 102B and can be, for example, a base transceiver station, a radio base station, an eNodeB device, or an enhanced eNodeB device. Access node 106 is in communication with communication network 108 over communication link 114.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device such as wireless devices 102A and 102B. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112A, 112B and 114 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 106 and communication network 108 which are omitted for clarity, including additional processing nodes, routers, gateways, and physical and/or wireless data links for carrying data among the various network elements.

Tethering refers to the sharing by a device of its capability to access a network with another device. A device performing tethering can be capable of sharing its network access with multiple additional devices. When a wireless device performs tethering, the wireless device and the additional device or devices share the wireless network communication link of the wireless device. For example, wireless device 102A can perform tethering to share its wireless communication capability with device 104, enabling device 104 to communicate with access node 106 over communication link 112A. In such a case, communications received by access node 106 appear to originate from wireless device 102A whether or not they are originated by device 104 or by wireless device 102A. The connection between the wireless device and the additional device can be made through a wired or wireless connection.

Unauthorized tethering is of great concern to network operators. It increases the consumption of network resources, such as bandwidth, and can also cause network congestion. With the advent of wireless devices capable of acting as a network access point, for example, as a WiFi hot spot, increasing numbers of users can modify wireless devices to enable such network access point feature without authorization from a network provider.

In an embodiment, it is determined that a number of wireless devices 102A and 102B in active communication with access node 106 meets a connections criteria, and in operation 204 it is determined that a loading of access node 106 meets a loading criteria. Data packets received at the access node from the wireless devices are inspected to identify at least one short-lived data flow and a source wireless device of the at least one short-lived data flow. A number of short-lived data flows are determined for the source wireless device during an observation time period, and the source wireless device is identified as performing unauthorized tethering when the number of short-lived data flows during the first time period meets a data flow threshold.

Figure 2:
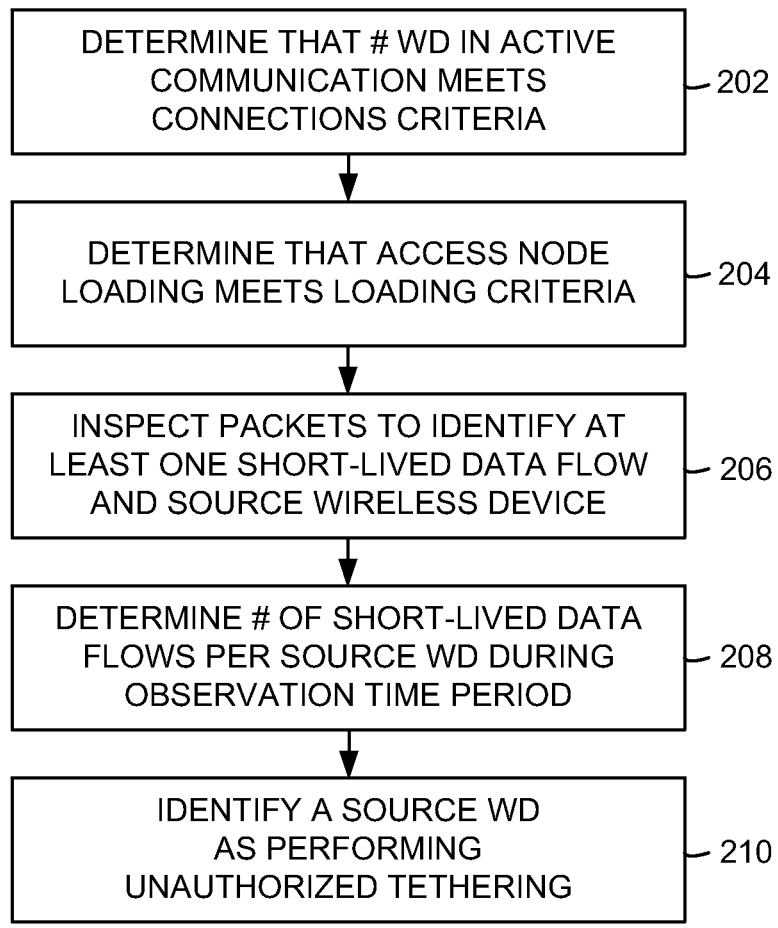
FIG. 2 illustrates an exemplary method of detecting unauthorized tethering by a wireless device.

FIG. 2 illustrates an exemplary method of detecting unauthorized tethering by a wireless device. In operation 202, it is determined that a number of wireless devices in active communication with the access node meets a connections criteria, and that an access node loading meets a loading criteria. For example, it can be determined that access node 106 is in active communication with wireless device 102A and wireless device 102B. It can further be determined that a loading of communication links 112A and 112B meets a loading criteria and is inconsistent with the number of wireless devices with which access node 106 is in active communication. For example, device 104 can send and receive information from access node 106 via wireless device 102A, and while this data traffic may appear to access node 106 as if it is from wireless device 102A, it may be determined that the data load is inconsistent with expected communication with wireless device 102A alone. The loading criteria can be determined in a variety of ways, including a requested data rate, or a type of data traffic, or an amount of data traffic, and the like. Additionally, or alternatively, the loading criteria can be determined based on the number and/or type of data flows between wireless device 102A and access node 106.

In operation 206, packets received at the access node from the wireless devices are inspected to identify at least one short-lived data flow and a source wireless device of the at least one short-lived data flow. Network data flows can be characterized as being short-lived or long-lived. Communications systems which convey data typically employ a form of congestion control to prevent communications links from becoming overloaded with data traffic. Many congestion control systems include at least two phases, a first phase (such as a slow start phase or a fast recovery phase in the case of transfer control protocol (TCP)), in which a data rate from a sender to a recipient is rapidly increased, and a second phase, (such as a steady-state phase or a congestion avoidance phase) in which can begin when a predetermined threshold data rate is reached in the first phase, and in which the data rate is adjusted substantially more slowly than during the first phase.

A data rate or an amount of data permitted to be in transit between a sender and a receiver can be, for example, increased based on acknowledgments of receipt by the sender, or reduced base on indications of data loss or reception failure. A short-lived data flow typically comprises a relatively short burst of data, and in many cases a short-lived data flow does not extend beyond the first phase of a congestion control system. Short-lived data flows typically exhibit rapid changes in data transmitted (for example, they can be more "bursty"), and can be associated with applications that involve a high degree of user interaction, such as web browsing applications, email and text messaging applications, and the like. A long-lived data flow typically comprises a larger number of data packets than a short-lived flow, and typically is sufficiently long to reach the second phase of the congestion control method. Short-lived data flows can also be characterized as more bursty than long-lived data flows. Packets received at access node 106 from wireless devices 102A and 102B can be inspected to identify at least one short-lived data flow and a source wireless device of the at least one short-lived data flow.

Detection and monitoring of short-lived data flows can efficiently identify wireless devices performing unauthorized tethering. While a wireless device may have more than one established data flow, the likelihood of observing multiple short-lived data flows from a wireless device is relatively low. This is because short-lived data flows are of relatively short length and are bursty in nature, and also because a wireless device typically begins a short-lived data flow in response to a user input. Thus, a wireless device can typically be expected to begin a relatively very few data flows in a time period. When a wireless device performs tethering (whether authorized or not), it may be possible to observe relatively numerous short-lived flows which are substantially contemporaneous or simultaneous, or which reach a threshold number of short-lived flows per unit time, from the wireless device.

In operation 208, a number of short-lived data flows for the source wireless device is determined during an observation time period. For example, a number of short-lived data flows can be determined for wireless devices 102A and 102B during an observation time period. During a predetermined period of time, data traffic from wireless devices can be monitored, and short-lived data flows can be identified.

When the number of short-lived data flows during the first time period meets a data flow threshold, the source wireless device can be identified as performing unauthorized tethering (operation 210). For example, criteria can be determined, such as a number of short-lived data flows during the observation time period, or a number of substantially simultaneous short-lived data flows, or a percentage of observed data flows compared to a threshold number of short-lived data flows during the observation time period, and the like. Combinations of such criteria can also be used. Where such criteria are met by the number of observed short-lived data flows during the observation time period, the source wireless device can be determined to be performing unauthorized tethering.

For example, it can be determined that the communication between access node 106 and wireless device 102A involves a number of short-lived data flows which meets the threshold, and wireless device 102A can be identified as performing unauthorized tethering. When wireless device 102A is so identified, a data rate of communication link 112A can be decreased, or a maximum amount of data can be imposed on wireless device 102A to limit an amount of data communicated over communication link 112A. Further, the communication link with wireless device 102A can be limited in time or terminated. Moreover, wireless device 102A can be reported to an accounting node (such as an authentication, authorization and accounting (AAA) node or another similar network element) and fees can be imposed on wireless device 102A for the determined tethering activity. In an embodiment, adjusting a data flow to and/or from wireless device 102A can comprise one of reducing a data flow below a first threshold, limiting an amount of data communicated with wireless device 102A, limiting a time of a network connection, limiting a time of a communication session with access node 106, and reducing a data flow below a second threshold until a subscription confirmation is received.

Figure 3:
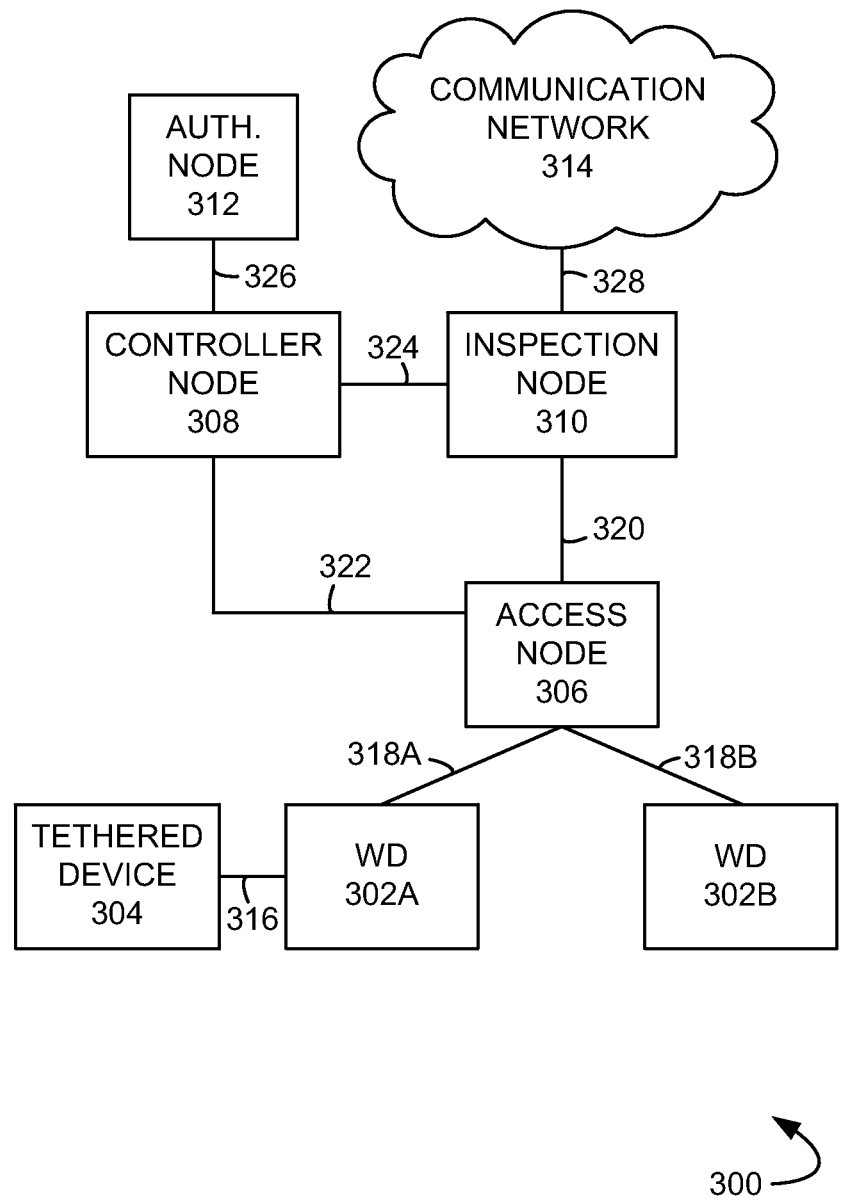
FIG. 3 illustrates another exemplary communication system to detect unauthorized tethering by a wireless device.

FIG. 3 illustrates another exemplary communication system 300 to detect unauthorized tethering by a wireless device comprising wireless devices 302A and 302B, tethered device 304, access node 306, controller node 308, inspection node 310, authorization node 312, and communications network 314. Examples of wireless devices 302A and 302B can include a cell phone, a smart phone, a computing platform such as a laptop, palmtop, or tablet, a personal digital assistant, an internet access device, or other device capable of wireless communication, including combinations thereof. Examples of tethered device 304 can also include a cell phone, a smart phone, a computing platform such as a laptop, palmtop, or tablet, a personal digital assistant, including combinations thereof. Tethered device 304 can communicate with wireless device 302A over communication link 316.

Access node 306 is in communication with the wireless devices 302A over communication link 318A and with wireless device 302B over communication link 3183B. Access node 306 is a network node capable of providing wireless communications to wireless devices 302A and 302B and can be, for example, a base transceiver station, a radio base station, an eNodeB device, or an enhanced eNodeB device. Access node 306 is in communication controller node 308 over communication link 322 and with inspection node 310 over communication link 320.

Controller node 308 can perform call control and mobility management functions in communication system 300. Controller node 308 can be configured and receive instructions and other input at a user interface. Examples of controller node 308 can include a standalone computing device, a computer system, or a network component, for example, a mobility management entity (MME), a mobile switching center (MSC), a call session control function (CSCF), and the like. Controller node 308 is in communication with inspection node 310 over communication link 324 and with authentication node 312 over communication link 326.

Inspection node 310 is a network element which can comprise a processor and associated circuitry to execute or direct the execution of computer-readable instructions. Inspection node 310 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Inspection node 310 can, among other things, perform deep packet inspection of packets sent from and/or to wireless devices 302A and 302B. Deep packet inspection generally involves an inspection of packets beyond Open Systems Interconnection (OSI) layer 3 including an inspection of the data portion of a packet (and possibly also the header of a packet). Inspection node 310 can be for example, a standalone computing device or network element, or the functionality of mode inspection node 310 can be included in another network element, such as a mobility management entity (MME), a gateway, a proxy node, or another network element.

Authentication node 312 enables control over access by wireless devices to network services, and control over allocation of resources to which wireless devices have access. Authentication node 312 can be configured to perform authentication, authorization and accounting functions in communication system 300. Authentication node 312 can be for example, a standalone computing device or network element, or the functionality of mode inspection node 312 can be included in another network element, such as a gateway, a proxy node, or another network element.

Communication network 314 is in communication with inspection node 310 over communication link 328. Communication network 314 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 314 can be capable of carrying voice information and other data, for example, to support communications by a wireless device such as wireless devices 302A and 302B. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 314 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 314 may also comprise a wireless network, including base stations, wireless communication nodes, telephony switches, internet routers, network gateways, computer systems, communication links, or some other type of communication equipment, and combinations thereof.

Communication links 316, 318A, 318B, 320, 322, 324, 326 and 328 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 306, controller node 308, inspection node 310, and authentication node 312 and communication network 314 which are omitted for clarity, including additional processing nodes, routers, gateways, and physical and/or wireless data links for carrying data among the various network elements.

Figure 4:
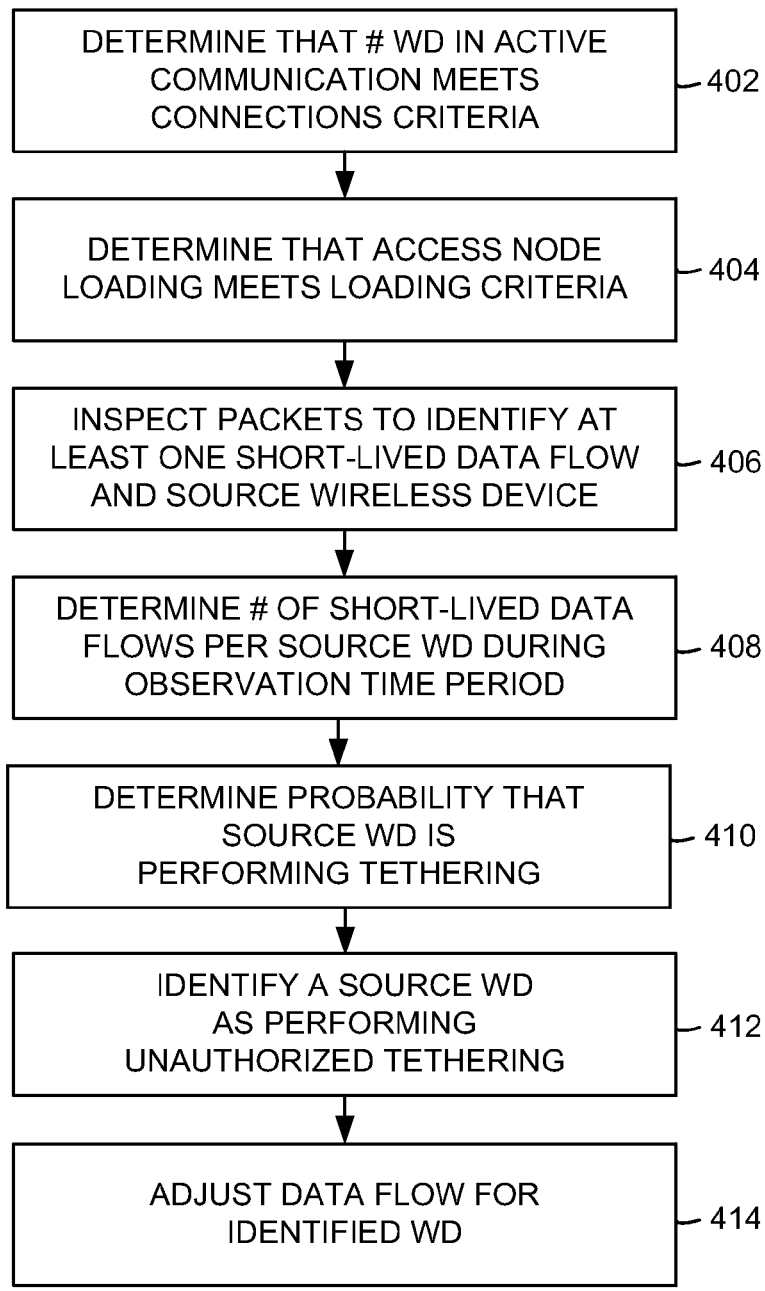
FIG. 4. illustrates another exemplary method of detecting unauthorized tethering by a wireless device.

FIG. 4 illustrates another exemplary method of detecting unauthorized tethering by a wireless device. In operation 402, it is determined that a number of wireless devices in active communication with the access node meets a connections criteria, and that an access node loading meets a loading criteria. For example, it can be determined that access node 306 is in active communication with wireless device 302A and wireless device 302B. It can further be determined that a loading of communication links 318A and 318B meets a loading criteria and is inconsistent with the number of wireless devices with which access node 306 is in active communication. For example, tethered device 304 can send and receive information from access node 306 via wireless device 302A, and while this data traffic may appear to access node 306 as if it is from wireless device 302A, it may be determined that the data load is inconsistent with expected communication with wireless device 302A alone. The loading criteria can be determined in a variety of ways, including a requested data rate, or a type of data traffic, or an amount of data traffic, and the like. Additionally, or alternatively, the loading criteria can be determined based on the number and/or type of data flows between wireless device 302A and access node 306.

Figure 5:
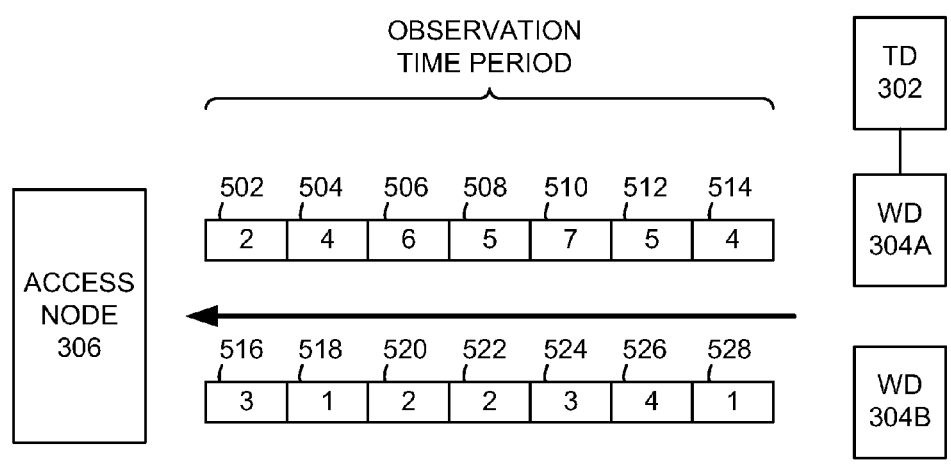
FIG. 5 illustrates exemplary determinations of short-lived data flows during an observation time period.

In operation 406, packets received at the access node from the wireless devices are inspected to identify at least one short-lived data flow and a source wireless device of the at least one short-lived data flow. For example, data packets can be inspected at inspection node 310 to determine whether they are associated with a short-lived data flow or a long-lived data flow. In operation 408, a number of short-lived data flows is determined for each source wireless device during an observation time period. For example, referring to FIG. 5, short-lived data flows can be identified from wireless device 304A and wireless device 304B. Further, a number of short-lived data flows can be determined for each of wireless device 304A and wireless device 304B during an observation time period. In an embodiment, a plurality of observations can be performed during the observation time period. For example, during an observation time period (such as a period of minutes or seconds), a plurality of observations 502, 504, 506, 508, 510, 512 and 514 can be performed for wireless device 304A. Similarly, during the observation time period a plurality of observations 516, 518, 520, 522, 524, 546 and 528 can be made for wireless device 304B. Each of the plurality of observations can be made over a period of time substantially shorter than the observation time period. For example, in one embodiment the observation time period can be fifteen minutes, and the plurality of observations can each be made in a one second sampling interval. The number of observations illustrated in FIG. 5 is merely exemplary, and greater or fewer observations can be performed. A number of short-lived data flows from wireless devices 304A and 304B can be determined in each of the plurality of observation, indicated in FIG. 5 by a number within each observation. For example, 2 short-lived data flows are observed in observation 502, 4 short-lived data flows are observed in observation 504, 6 short-lived data flows are observed in observation 508, and so forth. For wireless device 304B, 3 short-lived data flows are observed in observation 516, 1 short-lived data flow is observed in observation 518, 2 short-lived data flows are observed in observation 520, and so forth. It can be determined for a wireless device that the number of determined short-lived data flows meets a data flow threshold. The data flow threshold can comprise a number of short-lived data flows, an average number of short-lived data flows, a percentage of all data flows from the wireless device, and the like, including combinations thereof.

Returning to FIG. 4, in operation 410, a probability that a source wireless device is performing tethering is determined based on the number of short-lived data flows from the source wireless device during the observation time period and the data flow threshold. For example, when the number of short-lived data flows during the observation time period meets the data flow threshold, it can be determined that the wireless device is performing tethering.

In an embodiment, a number of short-lived data flows can be provided as a first threshold, and a percentage of observations which meet the first threshold can be provided as a second threshold. When the percentage of observations of short-lived data flows meets the second threshold, the source wireless device can be determined to be likely performing unauthorized tethering.

As one example, a number of short-lived data flows, such as two, can be provided as a first threshold. The short-lived data flows provided as the first threshold can be simultaneous, or substantially simultaneous. Further, a percentage of observations which meet the first threshold (such as 80%, which in this example corresponds to one or two simultaneous or substantially simultaneous short-lived data flows) can be provided as a second threshold. That is, for a source wireless device, an expected number of observations corresponding to one or two substantially simultaneous short-lived data flows can be provided to be at least 80%. In such case, the lower the percentage of observed short-term data flows that meets the expected number of substantially simultaneous short-lived data flows, the greater the likelihood that the source wireless device is performing tethering.

For example, a probability that a wireless device is performing tethering can be determined according to Equation 1:

$$K=(Y_{TH}-Y_{Obs})/Y_{TH},\quad\quad\quad\text{[Equation 1]}$$

where $Y_{Obs}$ is a is a percentage of observations which meet a threshold number of short-lived data flows, $Y_{TH}$ is a threshold percentage of observations, and K is the probability that a source wireless device is performing tethering. Thus, for example, where a number of short-lived data flows, such as 2, is provided as a first threshold, and a percentage of observations which meet the first threshold, such as 80%, is provided as a second threshold, when the number of observed short-lived flows from a wireless device during the observation time period is 60%, the probability that the source wireless device is performing tethering can be determined to be 0.25 or 25%. As another example, when the number of observed short-lived flows from a wireless device during the observation time period is 20%, the probability that the source wireless device is performing tethering can be determined to be 0.75 or 75%. As yet another example, when the number of observed short-lived flows from a wireless device during the observation time period is 0%, the probability that the source wireless device is performing tethering can be determined to be 1 or 100%. When the probability that the source wireless device is performing unauthorized tethering meets a probability threshold, the source device can be identified as performing tethering.

When a device is determined to be likely to be performing tethering, information can be received from authorization node 312 (e.g., in response to a query) indicating whether a wireless device is authorized to perform tethering. When authorization node 312 indicates that a wireless device is authorized to perform tethering, no negative action is taken against such wireless device. In an embodiment, a wireless device can be authorized to perform tethering within certain limits, such as for a maximum number of tethered devices, or for a maximum permitted data rate, or a maximum amount of data during a time period, and the like. The first and second thresholds described above can be adjusted to permit the detection of a wireless device which meets or exceeds its authorized tethering limits.

In an embodiment, a wireless device can be identified as performing tethering when the wireless device is determined to be performing tethering during a threshold number of observation time periods. The observation time periods in which the wireless device is determined to be performing tethering can be consecutive (for example, a threshold number of consecutive observation time periods) or non-consecutive (for example, 3 out of 5 observation time periods, or a similar subset of time periods).

When a source wireless device is identified as performing unauthorized tethering, a data flow to or from the wireless device can be adjusted (operation 414). The data flow can be adjusted in various ways. For example, the data flow to a wireless device can be reduced to a threshold data flow, to preserve network resources for authorized devices. The threshold can be an average network usage. As one example, considering all of the wireless devices in communication with access node 306, if on average a wireless device uses 5% of network resources, then the threshold can be determined to be 5% of available resources, and a usage cap at the threshold can be imposed on unauthorized wireless devices accordingly. Thus, the impact on network utilization of devices performing unauthorized tethering can be mitigated. The data flow to the wireless device can also be terminated. In addition, an amount of data sent to and/or received from a wireless device can be limited to a threshold amount of data per unit time. Also, an amount of time which a wireless device is permitted to access the communication network 314 can be limited to a period of time.

As another example, a notification can be provided to the wireless device that its unauthorized tethering has been detected, and that the reduction in data flow will be imposed until an indication is received that a subscription for tethering services has been entered into by a user. Alternatively, or in addition, a fee associated with the unauthorized tethering can be imposed on the wireless device through authorization node 312. An opportunity to subscribe to tethering services can also be provided to the wireless device. For example, a web page or portal page can be presented to the wireless device to provide an opportunity to adjust a subscription or to sign up for tethering services. In such case, the data flow to a wireless device can be reduced to a threshold until a subscription confirmation is received, for example, from the wireless device, or from authorization node 312. Similarly, the data flow can be reduced to zero pending receipt of a subscription confirmation.

Figure 6:
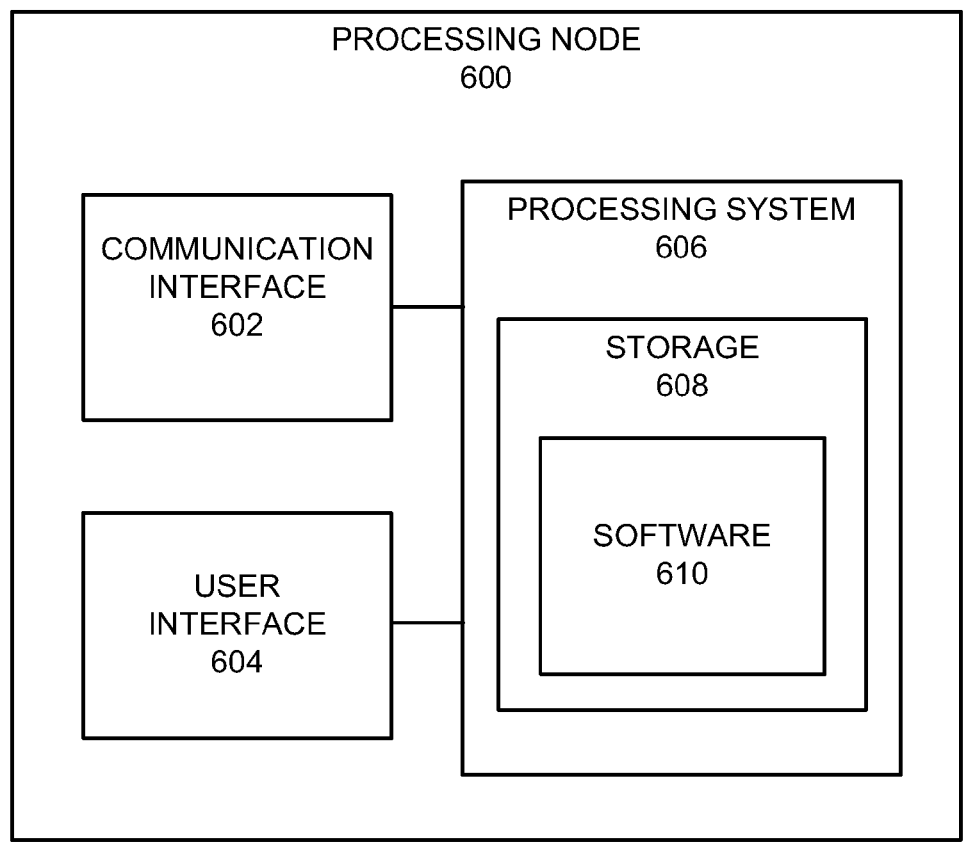
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 is capable of detecting a wireless device utilizing unauthorized tethering. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 308 and inspection node 310. Processing node 600 can also be an adjunct or component of a network element, such as an element of access node 106 or access node 306. Processing node 600 can also be another network element in a communication system. Additionally, the functionality of processing node 600 can be distributed over two or more network elements.

The exemplary systems and methods described herein can be performed under the control of a processing system executing computer-readable codes embedded on a computer-readable recording medium or on communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, signals which modulate carrier waves transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of detecting unauthorized tethering by a wireless device, comprising:
    determining that a number of wireless devices in active communication with an access node meets a connections criteria, and that an access node loading meets a loading criteria;
    inspecting packets received at the access node from the wireless devices to identify at least one short-lived data flow and a source wireless device of the at least one short-lived data flow, wherein the at least one short-lived data flow comprises a plurality of packets such that a number of packets for the short-lived data flow is smaller than a number of packets for a long-lived data flow;
    determining for the source wireless device a number of short-lived data flows during an observation time period; and identifying the source wireless device as performing unauthorized tethering when the number of short-lived data flows during the first time period meets a data flow threshold.

2. The method of claim 1, wherein determining for each source wireless device a number of short-lived data flows further comprises:
performing a plurality of observations of the at least one data flows from each source wireless device during the observation time period; and
determining the number of short-lived data flows from each source wireless device in each of the plurality of observations during the observation time period.

3. The method of claim 1, wherein the data flow threshold further comprises a percentage of short-lived data flows during the observation time period.

4. The method of claim 3, further comprising identifying a source wireless device as performing unauthorized tethering when the percentage of short-lived data flows during the observation time period meets the data flow threshold.

5. The method of claim 1, wherein identifying a source wireless device as performing unauthorized tethering further comprises:
determining a probability that a source wireless device is performing unauthorized tethering based on the number of short-lived data flows from the source wireless device during the observation time period and the data flow threshold; and
identifying the source wireless device as performing unauthorized tethering when the probability that the source wireless device is performing unauthorized tethering meets a probability threshold.

6. The method of claim 1, further comprising:
adjusting a data flow for the source wireless device identified as performing unauthorized tethering.

7. The method of claim 6, wherein adjusting a data flow further comprises at least one of reducing a data flow below a first threshold, limiting an amount of data, limiting a time of a connection, limiting a time of a session, and reducing a data flow below a second threshold until a subscription confirmation is received.

8. A system for detecting unauthorized tethering by a wireless device, comprising:
a processing node, configured to
determine that a number of wireless devices in active communication with an access node meets a connections criteria, and that an access node loading meets a loading criteria;
inspect packets received at the access node from the wireless devices to identify at least one short-lived data flow and a source wireless device of the at least one short-lived data flow, wherein the at least one short-lived data flow comprises a plurality of packets such that a number of packets for the short-lived data flow is smaller than a number of packets for a long-lived data flow;
determine for the source wireless device a number of short-lived data flows during an observation time period; and
identify the source wireless device as performing unauthorized tethering when the number of short-lived data flows during the first time period meets a data flow threshold.

9. The system of claim 8, wherein the processing node is further configured to:
perform a plurality of observations of the at least one data flows from each source wireless device during the observation time period; and
determine the number of short-lived data flows from each source wireless device in each of the plurality of observations during the observation time period.

10. The system of claim 8, wherein the data flow threshold further comprises a percentage of short-lived data flows during the observation time period.

11. The system of claim 10, wherein the processing node is further configured to:
identify a source wireless device as performing unauthorized tethering when the percentage of short-lived data flows during the observation time period meets the data flow threshold.

12. The system of claim 8, wherein the processing node is further configured to:
determine a probability that a source wireless device is performing unauthorized tethering based on the number of short-lived data flows from the source wireless device during the observation time period and the data flow threshold; and
identify the source wireless device as performing unauthorized tethering when the probability that the source wireless device is performing unauthorized tethering meets a probability threshold.

13. The system of claim 8, wherein the processing node is further configured to:
adjust a data flow for the source wireless device identified as performing unauthorized tethering.

14. The system of claim 13, wherein the processing node is further configured to adjust the data flow further comprises by at least one of reducing a data flow below a first threshold, limiting an amount of data, limiting a time of a connection, limiting a time of a session, and reducing a data flow below a second threshold until a subscription confirmation is received.

15. A non-transitory computer-readable medium storing computer-executable instructions for a method of detecting unauthorized tethering by a wireless device, comprising:
determining that a number of wireless devices in active communication with an access node meets a connections criteria, and that an access node loading meets a loading criteria;
inspecting packets received at the access node from the wireless devices to identify at least one short-lived data flow and a source wireless device of the at least one short-lived data flow, wherein the at least one short-lived data flow comprises a plurality of packets such that a number of packets for the short-lived data flow is smaller than a number of packets for a long-lived data flow;
determining for the source wireless device a number of short-lived data flows during an observation time period; and
identifying the source wireless device as performing unauthorized tethering when the number of short-lived data flows during the first time period meets a data flow threshold.

16. The non-transitory computer-readable medium of claim 15, wherein determining for each source wireless device a number of short-lived data flows further comprises:
performing a plurality of observations of the at least one data flows from each source wireless device during the observation time period; and
determining the number of short-lived data flows from each source wireless device in each of the plurality of observations during the observation time period.

17. The non-transitory computer-readable medium of claim 15, wherein the data flow threshold further comprises a percentage of short-lived data flows during the observation time period.

18. The non-transitory computer-readable medium of claim 17, wherein the method further comprises identifying a source wireless device as performing unauthorized tethering when the percentage of short-lived data flows during the observation time period meets the data flow threshold.

19. The non-transitory computer-readable medium of claim 15, wherein identifying a source wireless device as performing unauthorized tethering further comprises:
   determining a probability that a source wireless device is performing unauthorized tethering based on the number of short-lived data flows from the source wireless device during the observation time period and the data flow threshold; and
   identifying the source wireless device as performing unauthorized tethering when the probability that the source wireless device is performing unauthorized tethering meets a probability threshold.

20. The non-transitory computer-readable medium of claim 15, wherein the method further comprises:
   adjusting a data flow for the source wireless device identified as performing unauthorized tethering, wherein adjusting a data flow further comprises at least one of reducing a data flow below a first threshold, limiting an amount of data, limiting a time of a connection, limiting a time of a session, and reducing a data flow below a second threshold until a subscription confirmation is received.

* * * * *